United States Patent
von Rothkirch und Panthen et al.

(10) Patent No.: US 9,533,608 B2
(45) Date of Patent: Jan. 3, 2017

(54) ARMREST WITH PLASTIC BEARING

(75) Inventors: Eberhard von Rothkirch und Panthen, Sommerach (DE); Thomas Hessdörfer, Karlstadt (DE)

(73) Assignee: F.S. FEHRER AUTOMOTIVE GMBH, Kitzingen (DE)

( * ) Notice: Subject to any disclaimer, the term of this patent is extended or adjusted under 35 U.S.C. 154(b) by 802 days.

(21) Appl. No.: 13/420,658

(22) Filed: Mar. 15, 2012

(65) Prior Publication Data

US 2012/0267933 A1    Oct. 25, 2012

(30) Foreign Application Priority Data

Apr. 19, 2011   (DE) .................... 10 2011 018 227

(51) Int. Cl.
  *B60N 2/42*   (2006.01)
  *B60N 2/46*   (2006.01)
  *B60N 3/10*   (2006.01)

(52) U.S. Cl.
  CPC ............ *B60N 2/4686* (2013.01); *B60N 2/4613* (2013.01); *B60N 3/101* (2013.01)

(58) Field of Classification Search
  CPC ....... A61G 5/12; B60N 2/4606; B60N 2/4633; B60N 2/4613; B60N 2/4686; A47C 7/543; A47C 7/68
  USPC .............. 297/411.3, 411.32, 411.38, 113, 115,297/188.14, 188.19
  See application file for complete search history.

(56) References Cited

U.S. PATENT DOCUMENTS

| | | | | |
|---|---|---|---|---|
| 3,807,799 A | * | 4/1974 | Freedman | 297/411.32 |
| D251,333 S | * | 3/1979 | Thrift et al. | D3/271.2 |
| 4,176,878 A | * | 12/1979 | Koutsky | 297/115 |
| 4,435,011 A | * | 3/1984 | Hakamata | 297/113 |
| 4,674,790 A | * | 6/1987 | Johnson | 296/153 |
| 4,946,226 A | * | 8/1990 | Hurn et al. | 297/411.38 |
| 5,076,645 A | * | 12/1991 | Yokota | 297/411.32 |
| 5,096,152 A | * | 3/1992 | Christiansen et al. | 248/311.2 |
| 5,116,099 A | * | 5/1992 | Kwasnik et al. | 297/188.15 |
| 5,752,739 A | * | 5/1998 | Saeki | 297/113 |
| 5,845,965 A | * | 12/1998 | Heath et al. | 297/188.19 |
| 5,947,554 A | * | 9/1999 | Mashkevich | 297/115 |

(Continued)

FOREIGN PATENT DOCUMENTS

| | | |
|---|---|---|
| CN | 101811457 A | 8/2010 |
| DE | 10 2010 008 675 A1 | 11/2010 |
| JP | 2009213604 A | 9/2009 |

OTHER PUBLICATIONS

State Intellectual Property Office of People'S Republic of China, First Office Action, Application No. 201210113198.5, Apr. 3, 2014, 14 pages.

(Continued)

*Primary Examiner* — David R Dunn
*Assistant Examiner* — Alexander Harrison
(74) *Attorney, Agent, or Firm* — Quarles & Brady LLP

(57) ABSTRACT

An armrest of a vehicle seat or a seat bench includes an arm support attached to a console element. A bearing arrangement enables swivel movement of the arm support between a support element of the arm support and the console element. In a preferred embodiment, the bearing arrangement is formed by at least three sliding bearings which are disposed so as to be distributed across the width of the armrest and which, in turn, are formed by the console element and the support element, which are made of a plastic material.

17 Claims, 15 Drawing Sheets

(56) References Cited

U.S. PATENT DOCUMENTS

| | | | |
|---|---|---|---|
| 6,015,190 A * | 1/2000 | Wend | 297/378.1 |
| 6,033,015 A * | 3/2000 | Husted | 297/188.19 |
| 6,089,669 A * | 7/2000 | Wilcox et al. | 297/452.65 |
| 6,264,273 B1 * | 7/2001 | Waters, Sr. | 297/188.14 |
| 6,425,631 B1 * | 7/2002 | Lin | 297/173 |
| 6,652,024 B2 * | 11/2003 | Prasatek | 297/188.2 |
| 6,832,412 B2 * | 12/2004 | Kim | 16/354 |
| 7,077,468 B2 * | 7/2006 | Maierholzner | 297/188.19 |
| 7,114,772 B2 * | 10/2006 | Kobayashi et al. | 297/188.04 |
| 8,662,594 B2 * | 3/2014 | Faccin | 297/411.38 |
| 8,789,881 B2 * | 7/2014 | von Rothkirch und Panthen et al. | 297/113 |
| 2001/0020799 A1 * | 9/2001 | Bullesbach et al. | 297/411.38 |
| 2002/0089217 A1 * | 7/2002 | Scheerhorn | 297/188.19 |
| 2002/0096928 A1 * | 7/2002 | Bidare | 297/411.32 |
| 2003/0020315 A1 * | 1/2003 | Laval | 297/411.32 |
| 2004/0135419 A1 * | 7/2004 | Kitamura et al. | 297/411.3 |
| 2004/0140697 A1 * | 7/2004 | Yuhki et al. | 297/113 |
| 2005/0023871 A1 * | 2/2005 | Cassaday | 297/217.3 |
| 2006/0006722 A1 * | 1/2006 | Kim | 297/411.3 |
| 2006/0071529 A1 * | 4/2006 | Yetukuri et al. | 297/411.32 |
| 2008/0093908 A1 * | 4/2008 | Cooley et al. | 297/411.3 |
| 2008/0100103 A1 * | 5/2008 | Kim | 297/188.19 |
| 2009/0140566 A1 * | 6/2009 | Canedo Pardo | 297/411.38 |
| 2009/0174236 A1 * | 7/2009 | Lota et al. | 297/188.19 |
| 2010/0207441 A1 | 8/2010 | Senges et al. | |
| 2011/0316310 A1 * | 12/2011 | Runde | 297/113 |
| 2012/0074741 A1 * | 3/2012 | Andersson | 297/188.14 |
| 2012/0223564 A1 * | 9/2012 | Andersson et al. | 297/411.3 |
| 2012/0261970 A1 * | 10/2012 | Girbinger et al. | 297/411.38 |

OTHER PUBLICATIONS

State Intellectual Property Office of People's Republic of China, Third Office Action and Search Report, Application No. 201210113198.5, Jul. 7, 2015.

* cited by examiner

ARMREST WITH PLASTIC BEARING

CROSS REFERENCE TO RELATED APPLICATION

The present application claims the benefit of German Patent Application No. 10 2011 018 227.6 filed Apr. 19, 2011, which is fully incorporated herein by reference.

STATEMENT REGARDING FEDERALLY SPONSORED RESEARCH OR DEVELOPMENT

Not applicable.

FIELD OF THE INVENTION

The present invention relates to an armrest for arrangement at a seat, respectively at a seat bench in a vehicle, wherein the arm support can be swiveled between two positions.

BACKGROUND OF THE INVENTION

Armrests having swivelable arm supports, in particular in the form of center armrests being integrated in a backseat bench or in the form of center armrests next to the driver seat are widely known from the state of the art. In particular in the case of use in a backseat bench, however, the problem of a small available assembly space is encountered. This aspect conflicts with the large potential bearing forces which may act on the arm support and gives rise to the demand for a correspondingly stably designed bearing in a small assembly space.

In the state of the art, for this purpose generally an arrangement is selected, wherein a console element being affixed to the backrest is made of a sheet metal having a bearing sleeve embossed therein. A continuous bearing bolt, which may optionally also be disposed at both sides of the arm support, is inserted into said bearing sleeve so as to be rotatably mounted therein. Said bearing bolt, in turn, generally is affixed to the supporting structure of the arm support.

In any case, the bearing combination is composed of two metallic load-bearing components being arranged relative to each other, even though plastic sleeves are possibly used for the purpose of reducing friction.

Generally, the aims to be pursued when designing vehicle components are focused on saving manufacturing and assembly costs, reducing the weight of all subassemblies and enhancing recyclability. However, said aims cannot be optimally achieved using the solutions known from the state of the art, wherein the subassemblies/components for mounting the arm support are made of metal.

SUMMARY OF THE INVENTION

Thus, it is an object of the present invention to provide an armrest by means of which in particular the above-cited aims can be achieved to the best possible extent.

This object is achieved by an inventive armrest including a console element, which can be attached to a seat or a seat bench, an arm support including a support element, and a bearing arrangement. The bearing arrangement includes at least three sliding bearings. Each slide bearing has a first sliding bearing part and a second sliding bearing part. The the arm support is swivelable about a swivel axis between a swiveled-up rest position and a swiveled-down support position. The console element includes the first sliding bearing part, and the support element includes the second sliding bearing part. The console element and the support element-are made of a plastic material, and the at least three sliding bearings are disposed so as to be distributed on an end of the armrest which, in the support position, faces toward the console element.

A generic armrest serves for arrangement at a seat or a seat bench in a vehicle. Here, the armrest comprises a console element and an arm support, wherein said armrest can be swiveled about a swivel axis between a swiveled-up rest position and a swiveled-down support position with the aid of a bearing arrangement in the connection between the console element and the arm support. Here, the console element can be attached to the seat, respectively the seat bench. In this context, the type of attachment is initially irrelevant. At least the console element constitutes the load-transmitting component which remains in its position upon swiveling of the arm support and transmits the forces acting on the arm support to the seat structure. Here, the arm support can be designed integrally or, as a general rule, can be designed as a subassembly. At least the arm support has a support element which realizes the connection to the console element. This connection is realized with the aid of the bearing arrangement which is formed by at least two sliding bearings each having at least a first sliding bearing part and an allocated second sliding bearing part. In any case, the second sliding bearing part is arranged in the first sliding bearing part, wherein the second sliding bearing part is movable relative to the first sliding bearing part. In this regard, it is irrelevant whether a rotational movement about the swivel axis and/or a translational movement in the plane perpendicular to the swivel axis are enabled. In the generic configuration, a sliding bearing part is part of the console element and the other sliding bearing part is part of the support element. Hence, a swivel movement of the arm support causes a sliding movement of the sliding bearing part being disposed at the support element relative to the sliding bearing part being disposed at the console element. It is obvious that a sliding bearing part is not supposed to be understood as a separate component, but forms an integral part of the support element, respectively the console element.

In any case, a sliding bearing is supposed to be constituted by a sliding bearing face of the first sliding bearing part being in sliding contact with the sliding bearing face of the second sliding bearing part. Thus, separate first and/or second sliding bearing faces result in separate sliding bearing arrangements, even though for instance in the state of the art, a continuous straight bearing bolt in a first alternative has only one sliding bearing face along the entire length thereof. This leads to the result that the at least two sliding bearings are disposed at a distance from each other toward the swivel axis. The position of the at least two sliding bearings is initially irrelevant. In the state of the art, the two sliding bearings are each disposed at both sides of the armrest.

Here, the swivel axis of the bearing arrangement may have a spatially fixed position and equally may be spatially displaceable by the swivel movement itself. Thus, when the swivel axis is fixed, the swivel movement of the arm support is executed in a circular motion, while the arm support is moved in an arcuate motion by the swivel movement when the swivel axis is spatially displaceable.

According to the invention, provision is made for the console element and the support element to be made of a plastic material. This means that the console element having the sliding bearing part disposed thereon and the support element having the sliding bearing part disposed thereon are made of a plastic material. Thus, the constructional design employed in the state of the art using metal components can be omitted and the need to use of metal for load transmission via the bearing arrangement is completely obviated.

In order to compensate for the required strength for transmitting the forces occurring on the arm support, the bearing arrangement here is formed by at least three sliding bearings. In that context, the arrangement of the at least three sliding bearings is realized on that end of the armrest which, in the rest position, faces toward the console element, wherein the sliding bearings are additionally arranged so as to be distributed across the entire range. Hence, this arrangement deviates from the arrangement of the bearing at both sides of the armrest, which is typically known from the state of the art, wherein a bearing generally is not provided across the width of the armrest. Instead, according to the invention, the sliding bearings are deliberately arranged so as to be distributed across the width of the armrest. The distributed arrangement of the sliding bearings does not necessarily require the exactly identical distance between respectively two sliding bearings. In particular when a plurality of sliding bearings are used, for instance, it is conceivable to provide an arrangement with alternating distances between respectively two sliding bearings.

By means of this newly created inventive embodiment, the pursued aims can be advantageously achieved. On the one hand, the manufacturing costs are reduced due to the selection of plastic components as opposed to the use of metal components. Moreover, as a general rule, the selection of plastic components makes it possible to reduce the weight of the entire subassembly as opposed to the use of metal components. Due to the aspect that plastic components are basically always used in an armrest, the omission of otherwise provided metal components in the supporting structure in the bearing arrangement between the arm support and the console element makes it consequently possible to markedly enhance recyclability.

Here, it is particularly advantageous if the console element and the support element are injection-molded parts made of a thermoplastic material. This embodiment makes it possible to realize the design of the armrest with optimal cost-efficiency and recyclability.

It is possible to further enhance in particular recyclability if the entire armrest inclusive of all components and parts is essentially completely composed in particular of a thermoplastic material. Thus, it is possible, where appropriate, to recycle the armrest as a complete subassembly and to merely shred said subassembly in order to provide the granulated material for another utilization.

Moreover, it is particularly advantageous if the support element at the same time integrally forms the stiffening supporting structure of the arm support. By means of this constructional design, the forces acting on the arm support are directly absorbed by the support element and are simultaneously distributed in the support element. By means of the sliding bearing part disposed at the support element, the load is hence transmitted via the bearing arrangement to the console element, and thus to the seat structure without the need for any unnecessary junctions. Thus, it is not necessary to connect any other supporting parts within the arm support. This enhances the flow of forces and at the same time saves manufacturing and assembly costs.

Due to the newly selected embodiment of the console element made of a plastic material it is for the first time also possible to design the console element such that it simultaneously covers a region below the arm support with respect to a portion of the seat, respectively the seat bench, which faces toward the interior of the vehicle. Hence, the console element has a shaping guided from the sliding bearing parts at the console element behind the assembly space being necessary for the arm support and pulled forward below the arm support to the level of the surrounding seat, respectively the seat bench, so as to have a planar appearance. Since the arm support with the bearing arrangement, as a general rule, is positioned in the lower region of the backrest, this embodiment makes it possible to cover the short portion in the surface of the backrest below the armrest up to the seating surface. This embodiment can be realized in particular due to the fact that a person sitting on a vehicle seat does not get into contact with the backrest region below the arm support. Hence, cushioning is not required in this region. Thus, said embodiments make it possible to achieve further cost savings due to the omission of the cushioning below the arm support.

The attachment of the console element to the seat, respectively the seat bench, can be realized in various ways. However, it is particularly advantageous if the console element is attached to the seat, respectively the seat bench, with the aid of form-fitting joining parts. Thus, connection elements as load-transmitting components, such as screws, rivets or the like, are not necessitated.

Here, it is particularly advantageous if the console element has an upper retaining portion for assembly of the same at the seat, respectively the seat bench, and if the seat, respectively the seat bench, has an upper receiving portion, wherein the upper retaining portion can be inserted and/or swiveled into the upper receiving portion. In this context, it is still further advantageous if a lower retaining portion of the console element can equally be inserted and/or swiveled into a lower receiving portion of the seat, respectively the seat bench.

Hence, in realizing said embodiments many options are available, wherein according to a first option provision can be made for the console element being inserted into the receiving portions at the seat simultaneously with the upper and the lower retaining portions in the direction of the swivel axis. Obviously, this necessitates a largely parallel alignment of the retaining portions, respectively the receiving portions.

However, it is particularly advantageous if the assembly can be realized as follows. Firstly, the upper retaining portion is inserted into the upper receiving portion, wherein the console element is swiveled by a small angle into the end position, and the lower retaining portion is disposed in front of the lower receiving portion. Subsequent to the complete insertion, the console element then is swiveled such that the lower retaining portion comes to rest above the lower receiving portion. Then the console element having the lower retaining portion can be inserted into the lower receiving portion, wherein the upper retaining portion within the upper receiving portion is pushed back by the corresponding insertion length into the lower receiving portion. This embodiment is particularly suitable to the effect that due to the kind of use of the arm support and the occurring forces, during the use, with a force in the console element which primarily acts vertically downwards, as a result a supporting force of the lower retaining portion is caused to act on the lower receiving portion. By contrast, oppositely directed upwardly acting forces in a first assembly direction virtually do not occur.

It is particularly advantageous if a latching element prevents disassembly of the console element from the seat, respectively the seat bench, wherein in particular the latching element is an integral part of the console element. By means of this measure, it is possible to realize a locking engagement in the end position already upon insertion of the lower retaining portion into the lower receiving portion without the need for any further auxiliary means. By the same token, of course it would equally also be conceivable to secure the position of the console element at the seat, respectively the seat bench, with the aid of pins, rivets or the like.

In realizing the bearing arrangement it is advantageous if the first sliding bearing part is disposed at the end of a cantilever arm and if the second sliding bearing part is disposed at the end of a cantilever beam. Depending on the allocation of the first and the second sliding bearing part, here the first sliding bearing part is formed by the console element or the support element, and the second sliding bearing part is formed by the support element or the console element. Corresponding to the plurality of sliding bearings, a plurality of cantilever arms and cantilever beams are equally provided, which are disposed so as to be distributed across the width of the armrest.

Various alternatives are available for implementing the sliding bearings, wherein in a first bearing alternative, the first sliding bearing part is a bearing sleeve and the second sliding bearing part is a shaft portion. By means of said first advantageous alternative, a particularly stable and at the same time simple configuration of the sliding bearing is realized. Thus, the shaft portion slides within the bearing sleeve about the swivel axis.

It is obvious that the first bearing alternative necessitates supporting of the arm support in the end positions. This can be realized with respect to the upper rest position in the use as a component of the backrest of a vehicle in a simple manner by abutment of the arm support in the receptacle for the arm support which is provided in the seat. Thus, the bearing arrangement in the upper rest position does not necessarily require an end stop or the like. If, in the lower support position, the arm support abuts on a load-bearing component being located underneath the same, supporting of the arm support in the region of the bearing arrangement is not required either. However, as a general rule, this is not the case. Hence, in the case of a lack of direct supporting means below the arm support, it is indispensable to make provision for a stop in the region of the bearing arrangement, at which the support element is supported against the console element and which prevents further swiveling of the arm support. For this purpose, various options are available for the skilled person, wherein in the simplest embodiment, the support element has a stop being disposed at a distance from the swivel axis outside of the sliding bearings and coming into abutment against a corresponding stop at the console element in the support position.

In a second bearing alternative it is advantageous if the first sliding bearing part is a ring segment groove which is disposed coaxially with respect to the swivel axis and if the second sliding bearing part is a ring segment web which can be swiveled about the swivel axis. Thus, a swivel movement of the ring segment web within the ring segment groove is realized. Due to the coaxial positioning and design of the ring segment groove, the arm support consequently equally executes a circular motion, just like in the first bearing alternative. In this embodiment, it is particularly advantageous that an additional stop for determining the end position and for supporting the arm support is not required. Instead, the end position is reached if the segment angle of the ring segment web is selected so as to be smaller than the segment angle of the ring segment groove by the swivel angle of the arm support. As a consequence, the ring segment web with its end abuts against the respective end of the ring segment groove. If a stop provided by means of the bearing arrangement is not necessary due to the assembly of the armrest, the angle of the ring segment groove at the side which does not necessitate a stop may consequently be selected so as to be larger.

The necessary segment angle for the ring segment web is further determined by the load to be transmitted. Said load, of course, can be reduced in the sliding bearing in the end position, in particular in the support position, if an additional stop is provided, and thus conditions that are comparable to the first bearing alternative are achieved.

If not only a swivel movement of the arm support in a circular motion is required, but if the same is in fact supposed to be guided in an arcuate motion, in a third bearing alternative, provision is advantageously made for sliding block guides. Here, at least three upper and three lower sliding block guides need to be provided, which each form a sliding bearing. Each sliding block guide here features an arcuate, in particular circle-segment-shaped, sliding guide groove as a first sliding bearing part, and a sliding element as a second sliding bearing part. Depending on the selection of the guide path of the upper and lower sliding block guides, an arcuate swivel movement of the arm support can be correspondingly realized, wherein during the swivel movement, a displacement of the swivel axis is realized. Here, the position of the upper and lower sliding block guides is initially arbitrary. Thus, a spatial separation is not required to the effect that the upper sliding block guide is disposed above the lower sliding block guide. Instead, the sliding block guides, in a plane perpendicular to the swivel axis, are to be disposed so as to be offset from each other. Here, the sliding elements can optionally be designed as short segment parts, or in the simplest case, can be of a bolt-like design. At least the sliding elements of the upper and lower sliding block guides are positioned at a predetermined distance from each other, and the sliding block guides hence need to be designed such that the distance defined by the sliding elements in the swivel movement is taken into account. For the purpose of better understanding, reference is further made to an exemplary embodiment described in the figures.

In particular the third bearing alternative enables a swivel movement of the arm support. In this way, for instance the arm support can occupy a lower position in the rest position compared to the support position in the region of the bearing arrangement. By the same token, the console element thus can be spatially disposed at a lower level than would be the case with a fixed swivel axis. This means that the end of the arm support which faces toward the console element not only rotates about the swivel axis, but is simultaneously lifted upon swiveling. Depending on the position of the sliding block guides, a displacement of the armrest into a position protruding further into the passenger compartment in the support position can be effected. Hence, an arm support being shorter in length can be used, which is provided by the forward displacement without loss of comfort for supporting the arm and/or for serving as a cupholder.

Various assembly alternatives are available for the assembly of the support element at the console element and the formation of the bearing arrangement, wherein in a first assembly alternative, an elastic deformation takes place during the assembly process, wherein in the fully assembled state, the deformation is largely or else completely restored. In this advantageous first assembly alternative, the cantilever beam, at the end of which the second sliding bearing part is disposed, is elastically deformable in the direction of the swivel axis. Thus, an assembly movement is enabled perpendicular to the swivel axis, in spite of the spatial overlap of the first sliding bearing part with the second sliding bearing part. Thus, the assembly movement leads to an elastic deformation, wherein in the assembly movement, the front face of the first sliding bearing part slides along the front face of the second sliding bearing part.

Thus, the sliding bearing parts are slid past each other while the cantilever beam is elastically deformed. As soon as the position is reached in which the first sliding bearing part is positioned so as to coincide with the position of the second sliding bearing part, the second sliding bearing part plunges into the first sliding bearing part and forms the sliding bearing, wherein the cantilever beam is restored. This applies in particular for all similar sliding bearings of the bearing arrangement. Hence, in this first assembly alternative, the assembly of the support element at the console element is consequently realized with the aid of a clip-type snap connection of the bearing arrangement.

Here, it is advantageous if at least two cantilever beams having the respective second sliding bearing parts are disposed so as to be symmetrically opposed to each other. Due to the forces occurring in the assembly process due to the elastic deformation, it is advantageous if the respective cantilever beams are disposed symmetrically so that the resulting forces within the support element, respectively the console element, are consequently compensated and thus are evenly distributed on all cantilever beams.

Moreover, it is particularly advantageous in the design of the first bearing alternative in the first assembly alternative if each bearing sleeve as a first sliding bearing part is provided with two symmetrically opposed shaft portions as second sliding bearing parts. Thus, each bearing sleeve at the same time forms two sliding bearings, wherein at least three bearing sleeves being arranged so as to be distributed and thus six sliding bearings are provided.

The clip-type assembly of the second sliding bearing parts on the first sliding bearing parts with the aid of the deformation of the cantilever beam taking place during assembly leads to a particularly simple and intuitive assembly type.

Even though the clip-like first assembly alternative prevents immediate disassembly of the support element from the console element, it is particularly advantageous if a locking mechanism is inserted at least between two cantilever beams, so that a deformation of the cantilever beams is substantially prevented. Thus, a high force occurring relatively between the support element and the console element, for instance a tensional force, does not lead to an elastic-plastic deformation of the bearing location and as a result to an inadmissible sliding apart of the sliding bearing parts and hence to a resulting deformation of the cantilever beams.

If the deformation of the cantilever beams is inadmissible for the purpose of assembly or cannot be sufficiently enabled, it is particularly advantageous to select a second assembly alternative. In this case, when designing the support element and the console element, provision needs to be made for an assembly space next to the front face of the first sliding bearing part. Thus, the first sliding bearing parts of the bearing arrangement each are to be arranged on the first side of the cantilever arm. The assembly space, apart from the two outer faces of the arm rest, is determined by the distance from the front face of a first sliding bearing part of a cantilever arm to the subsequent cantilever arm. The second sliding bearing part at the cantilever beam for this purpose needs to be respectively arranged on the first side at the end of the cantilever beam, wherein the first sliding bearing part at the cantilever arm and the second sliding bearing part at the cantilever beam are opposed to each other. The assembly space thus should be selected such that the second sliding bearing part having the cantilever beam can be inserted into the assembly space so as to be offset and free of deformation. Thus, the second sliding bearing part at the cantilever beam can be guided in a comb-like fashion towards the first sliding bearing part at the cantilever arm. When the first sliding bearing part is disposed so as to coincide with the position of the second sliding bearing part, the second sliding bearing part can then be inserted into the first sliding bearing part while forming the sliding bearing.

This second assembly alternative is particularly advantageous to the effect that a plurality of, at least three, sliding bearings can be employed while still enabling a simple assembly free of deformation.

Since, in contrast to the first assembly alternative, said second assembly alternative only requires the insertion of the second sliding bearing part into the first sliding bearing part for forming the sliding bearing, it is obviously particularly advantageous if an undesirable sliding apart of the sliding bearing parts is prevented. Here, this can be realized with the aid of a locking mechanism, wherein the assembly space provided for assembly and thus required for disassembly is locked and hence disassembly is prevented.

It is particularly advantageous and simple in the implementation if at least one latching bolt is used to realize the locking mechanism. Said latching bolt for this purpose can be preassembled at the cantilever arm or the cantilever beam prior to assembly of the armrest at the console element. Here, the latching bolt needs to be arranged so as to be displaceable relative to the assembly location in the direction of the swivel axis, wherein the latching bolt in the preassembled state must not prevent insertion of the second sliding bearing parts having the cantilever beam into the assembly spaces. The effective positioning of the latching bolt for realizing a locking mechanism for instance can be performed such that the latching bolt is displaced simultaneously with the insertion of the second sliding bearing part into the first sliding bearing part, respectively the relative displacement of the cantilever beam into the direction of the swivel axis toward the cantilever arm. Hence, the latching bolt is displaced together with the respectively other part, wherein in the assembled end position the locking bolt is automatically locked and prevents backward sliding. As a result, the locking bolt prevents a movement of the support element to the console element counter to the insertion direction and thus it prevents disassembly.

Alternatively to the first two assembly alternatives, in a particularly advantageous embodiment, a third assembly alternative is also available, wherein the bearing sleeve is connected to the shaft portion with the aid of an injection-molding assembly process. Due to the assembly of two components to each other with the aid of said injection-molding assembly process, it is possible to produce the bearing sleeve in a first injection-molding process from a first material and to produce the shaft portion in a second injection-molding process from a second material directly in the bearing sleeve. Here, firstly the component having the bearing sleeve is produced, and in a subsequent injection-molding process, the component having the shaft portion is produced, wherein the production is realized by direct arrangement at the bearing sleeve. Due to the selection of different materials and the subsequent process steps, direct material joining between the two materials of the bearing sleeve and the shaft portion is prevented. Thus, a sliding bearing is still provided, wherein the shaft portion is swivelably disposed in the bearing sleeve.

In the third assembly alternative, however, it is advantageous to reverse the arrangement and to firstly produce the shaft portion from a first material in the injection-molding assembly process, and to produce the bearing sleeve from a second material in a subsequent second injection-molding process directly on the shaft portion. By means of the injection-molding assembly process, subsequent to the injection-molding of a plastic component, a shrinking of the hot injection-molded component occurs as a function of the respective material properties due to the cooling process. As a result of the subsequent injection-molding of the bearing sleeve onto the shaft portion, it is thus possible to produce a free-of-play sliding bearing, wherein a small compressive force acts between the bearing sleeve and the shaft portion. This aspect is suitable to the effect that the process-related sliding friction due to the surface compression prevents, respectively at least reduces, a free swivel movement of the arm support and thus unintentional falling down of the armrest.

Since in the inventive embodiment provision is made for a plurality of sliding bearings being disposed so as to be distributed, in the previously described third assembly alternative with the production using an injection-molding assembly process, it is particularly advantageous if the plurality of shaft portions of the bearing arrangement form a hollow shaft being interrupted by the cantilever beams of the support element, respectively the console element. Thus, the bearing arrangement in the support element, respectively the console element, is a hollow shaft which is retained with the aid of a plurality of cantilever beams. The hollow shaft is particularly advantageous to the effect that it is thus possible to select larger bearing diameters without causing a too large material thickness in the region of the hollow shaft.

The various sliding bearing alternatives and the different assembly alternatives are exemplarily illustrated in the following figures for the purpose of better understanding.

DETAILED DESCRIPTION OF THE EXAMPLE EMBODIMENTS

Figure 1:
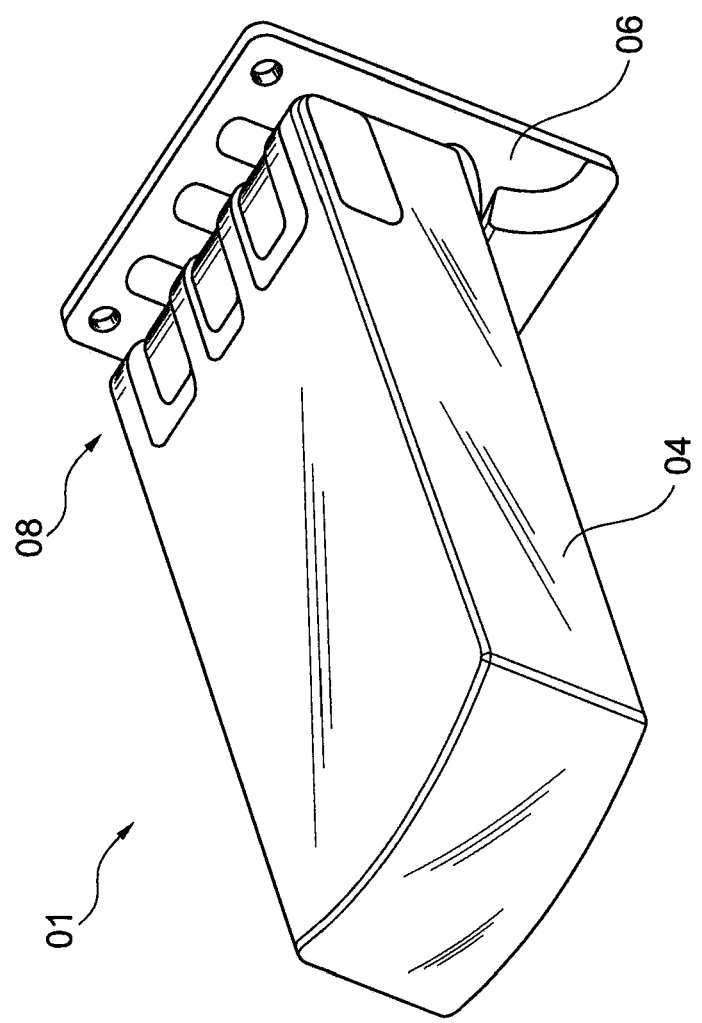
FIG. 1 shows a schematic view of an inventive armrest 01 in a first exemplary bearing alternative as well as a first assembly alternative.

FIG. 1 exemplarily shows a first exemplary embodiment for an inventive armrest 01. Here, the armrest 01 firstly has the arm support 04 which is connected to the console element 06 with the aid of the support element 05 (not shown). The bearing arrangement 08 is disposed between said two elements 05, 06, which enable the swivel movement of the arm support 04 between the illustrated swiveled-down support position and a swiveled-up rest position.

It is essential for the inventive embodiment 01 that the bearing arrangement 08 has a plurality of sliding bearings 10 which are disposed at the end of the arm support 04 which faces toward the console element 06. Moreover, it is essential that the sliding bearings 10 are disposed so as to be distributed across the width of the arm support 04.

Figure 2:
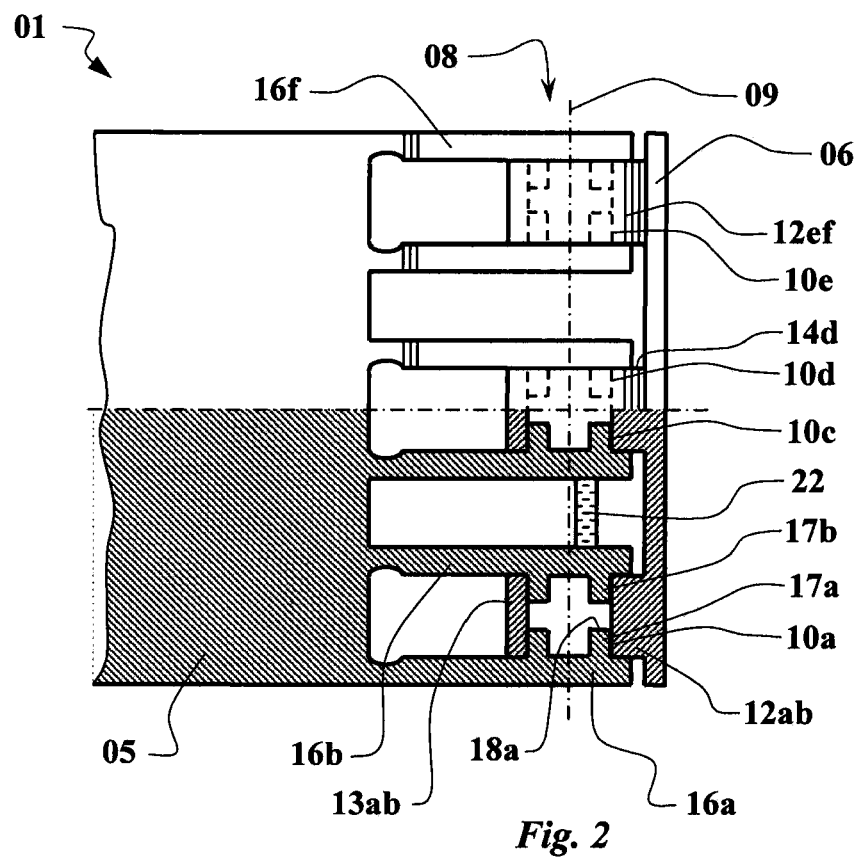
FIG. 2 shows a cross-sectional view of the bearing of the embodiment of FIG. 1 as a schematic diagram.

FIG. 2 schematically illustrates an example of the possible first bearing alternative as well as of a possible first assembly alternative. In said first bearing example, the bearing arrangement 08 of the armrest 01 comprises six sliding bearings 10a to 10f. Said sliding bearings are each formed by a bearing sleeve 13 as a first sliding bearing part as well as a shaft portion 17 as a second sliding bearing part. As is apparent in said exemplary embodiment, three bearing sleeves 13ab, 13cd, 13ef are each provided at cantilever arms 12ab, 12cd as well as 12ef at the console element 06. Within said bearing sleeves 13, respectively two sliding bearings 10a and 10b, 10c and 10d as well as 10e and 10f are disposed, which each have oppositely inserted shaft portions 17a and 17b, 17c and 17d, respectively 17e and 17f. The shaft portions 17 in turn are each connected to cantilever beams 16. This configuration is particularly advantageous to the effect that any further measures for ensuring the coherence of the bearing arrangement 08 are not required, and disassembly of the support element 05 from the console element 06 is automatically prevented.

Corresponding to the cylindrical design of the sliding bearing 10, the swivel axis 09 is disposed at an axial center thereof. Even though disassembly normally is not possible and a secure positioning of the sliding bearings 10 should be ensured, inadmissible deformation of the cantilever beams 16 and sliding of the shaft portions 17 out of the respective bearing sleeves 13 is prevented by an inserted locking mechanism 22. Here, said locking mechanism 22 at the same time advantageously may be formed by an upper cover part, which, subsequent to assembly of the support element 05 at the console element 06, is clipped or else slipped thereon.

Figure 3:
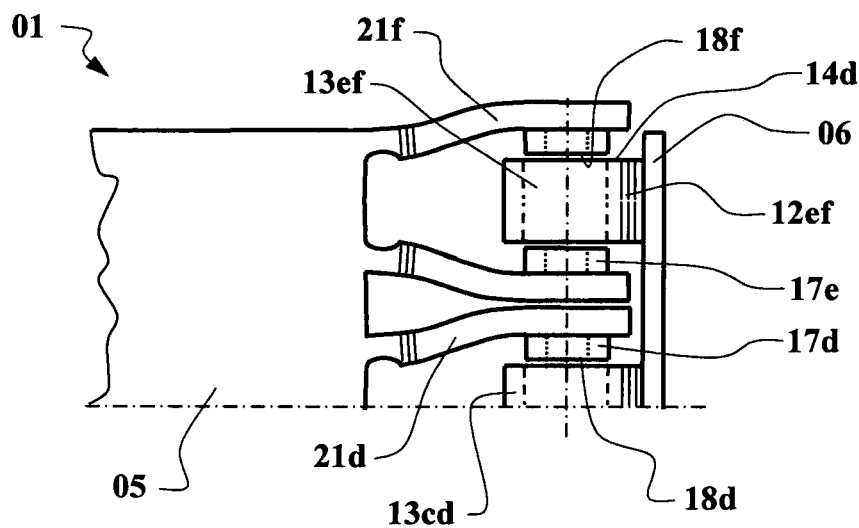
FIG. 3 shows the deformation of the cantilever beams 16 during assembly of the embodiment according to FIG. 1.

The assembly to be realized in the first assembly alternative is schematically illustrated in FIG. 3. Again, the armrest 01 has the support element 05 being arranged on the left-hand side and the console element 06 being arranged on the right-hand side. Here, only the upper half is illustrated, wherein the lower half is correspondingly configured in a symmetrical fashion. When the support element 05 slides onto the console element 06, firstly the cantilever beams 16 are elastically deformed and assume the shape of the illustrated deformed cantilever beams 21*d* to 21*f*. Here, the type of action causing deformation is firstly irrelevant. For example, it would be possible to make provision for insertion bevels at the cantilever arm 12, respectively the bearing sleeve 13, and on the other hand, at the cantilever beam 16, respectively the shaft portion 17. By the same token, it is conceivable to forcibly initiate a corresponding deformation with the aid of an assembly device. At least, provision is made for that in the deformed cantilever beams 21, firstly the front faces 14 of the bearing sleeves 13 slide along the front faces 18 of the shaft portions 17 during assembly. As soon as a coinciding position of the swivel axis 09 has been reached, as illustrated, the deformed cantilever beams 21 are automatically restored to their original shape and the shaft portions 17 are inserted into the respective bearing sleeves 13.

Figure 4:
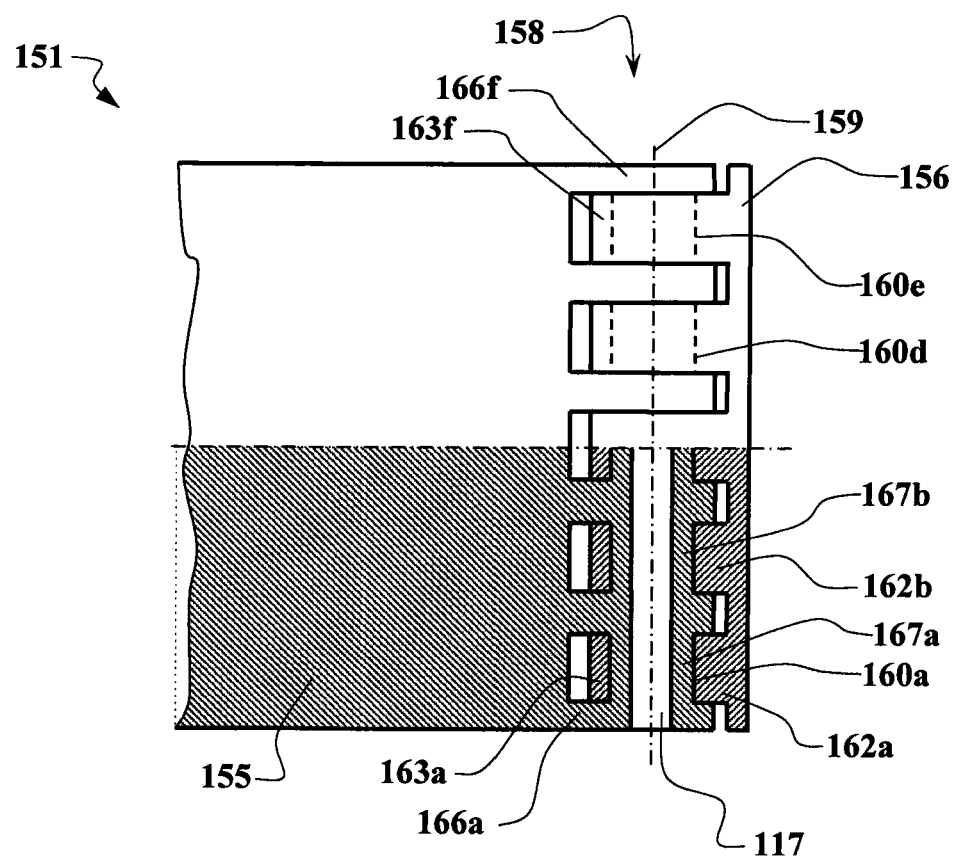
FIG. 4 shows a schematic view of a third assembly alternative of an armrest 151.

A functionally particularly reliable and stable embodiment of a bearing arrangement 158 can be attained if, in a third assembly alternative, an injection-molding assembly process is employed. For this purpose, FIG. 4 schematically illustrates an example of an armrest 151 in the third assembly alternative in analogy with the first bearing alternative. Here, the support element 155 has an essentially continuous hollow shaft 177 which is connected via the plurality of cantilever beams 166. The shaft portions 167 of the respective sliding bearings 160 are disposed on the hollow shaft between the respective cantilever beams 166. Here, the counterpart again is a respective bearing sleeve 163 which is integrally connected to the console element 156 with the aid of the cantilever arm 162.

Here, the production can be realized in the following manner: Firstly, the support element 155 together with the hollow shaft 177 having the varying cantilever beams 166 and the shaft portions 167 is produced. In a subsequent injection-molding process, the console element 156 is produced directly on the support element 155, and the shaft portions 167 are insert-molded to form the bearing sleeves 163. Thus, it is possible to produce a free-of-play bearing between the support element 155 and the console element 156.

Figure 5:
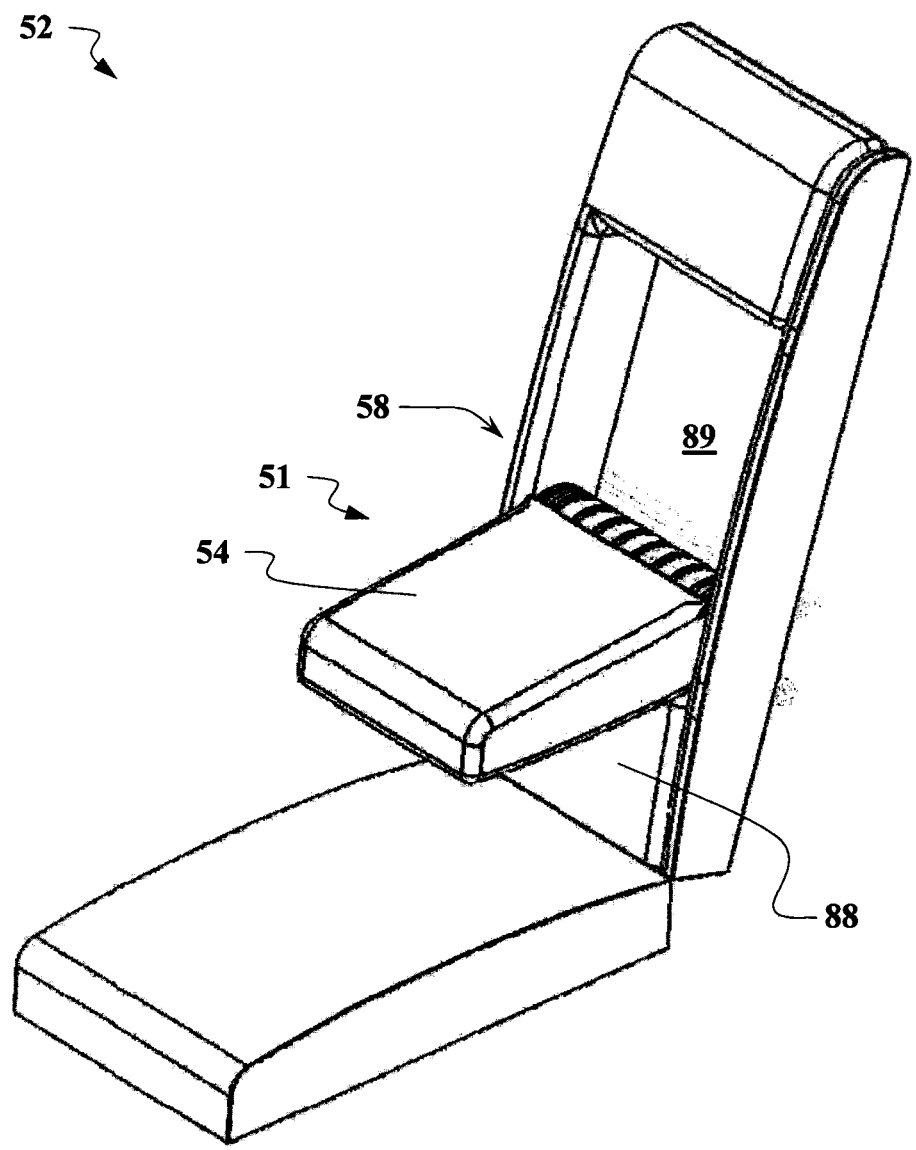
FIG. 5 shows a section of a seat bench 52 having an armrest 51 in a second bearing alternative and a second assembly alternative.

Another example of an inventive armrest 51 in a portion of a backseat bench 52 is schematically illustrated in FIG. 5. Here, in a second bearing alternative, the armrest 51 is again swivelably mounted with the aid of the bearing arrangement 58, wherein the support position of the arm support 54 is shown. It is obvious how the arm support 54 can be swiveled into the receptacle 89 in the backrest of the seat bench 52 for the purpose of swiveling into the rest position. It is obvious that in the case of employment as a part of a backrest, the arm support 54 in the swiveled-up position forms part of the backrest and thus needs to be cushioned. By contrast, no cushioning is required in portion 88 of the backrest below the armrest 51. This results from the aspect that a person sitting on the respective backseat does not get into contact with the lower region of the backrest.

Figure 6:
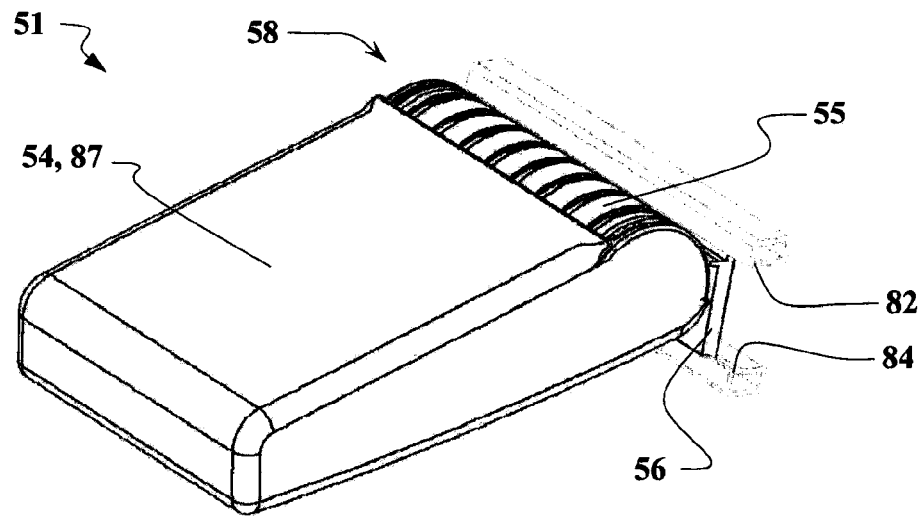
FIG. 6 shows the armrest 51 according to FIG. 5.

FIG. 6 schematically illustrates the armrest 51 of the exemplary embodiment according to FIG. 5. The arm support 54 is shown, wherein the outer shell forms a cushioning 87. In the region of the bearing arrangement 58, by contrast, the support element 55 of the armrest 51 is shown. Said support element 55 is connected to the console element 56 with the aid of the bearing arrangement 58, said console element in turn being attached to the seat 52, respectively the seat bench. This can be advantageously realized by means of inserting upper and lower retaining portions 81, 83 into upper and lower receiving portions 82, 84.

FIG. 7 again shows the armrest 51 in a further perspective view, here without the cushioning. The inventive embodiment of the bearing arrangement 58 with the aid of the sliding bearings 60, in this case eight sliding bearings, is partially shown. Here, in the second bearing alternative as well as in the second assembly alternative, the bearing arrangement 58 at the same time connects the support element 55 with the console element 56. In this view, the upper retaining portion 81 and the lower retaining portion 83 are also shown.

Figure 7:
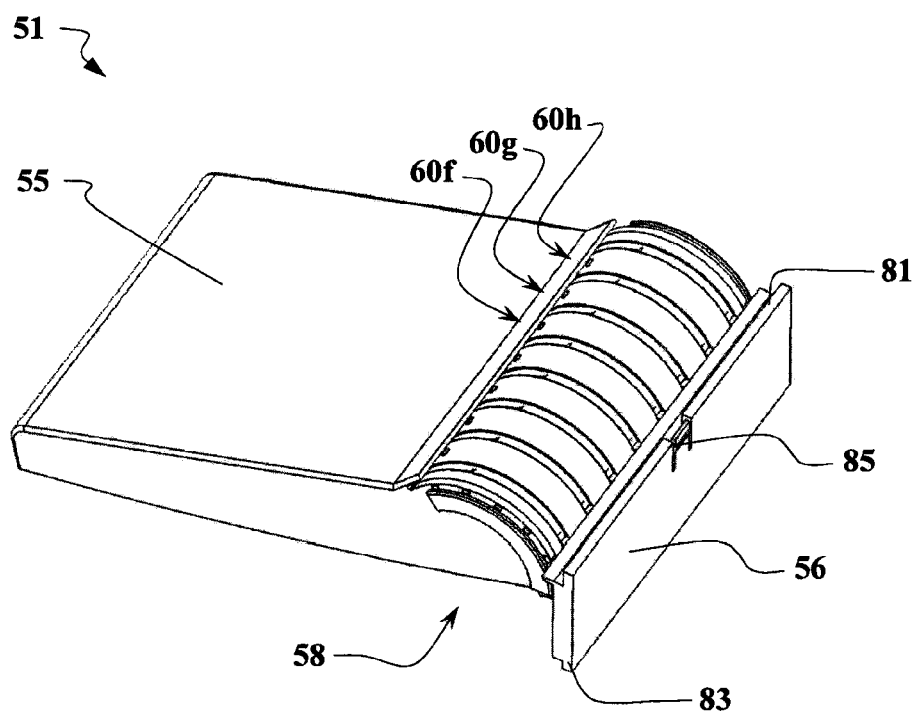
FIG. 7 shows the armrest 51 in a further perspective view.

A combined view of FIGS. 6 and 7 shows the assembly to be realized of the console element 56 at the seat structure 52 in an advantageous embodiment. Firstly, the upper retaining portion 81 needs to be inserted into the upper receiving portion 82, wherein firstly the lower retaining portion 83 is disposed in front of the lower receiving portion 84. Subsequent to complete insertion, the console element 56 having the armrest 51 then can be slightly swiveled downwards, so that the lower retaining portion 83 comes to rest above the lower receiving portion 84. Then, the console element 56 having the armrest 51 can be displaced downwards and the lower retaining portion 83 is fitted into the lower receiving portion 84. The securing of the end position is advantageously enabled with the aid of the latching element 85, which for this purpose is advantageously directly connected to the console element 56.

Figure 8:
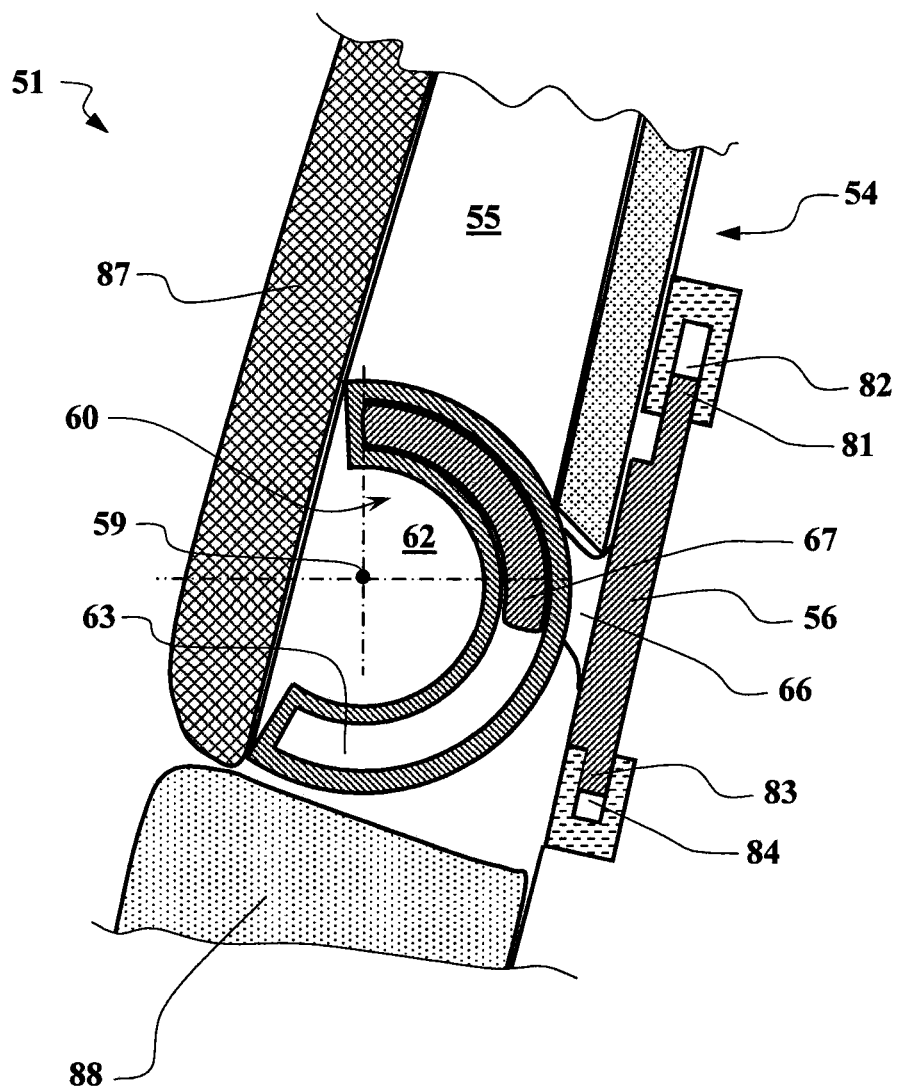
FIG. 8 shows a cross-sectional view of the sliding bearing 60 of the armrest 51 in the rest position.

The second bearing alternative is particularly advantageously shown in the schematic view of FIG. 8 showing the arrangement of the armrest 51 in the rest position. Firstly, the formation of the arm support 54 having the support element 55 and the cushioning 87 thereof are apparent. In each sliding bearing 60, a portion of the support element 55 forms a cantilever arm 62 which has a first sliding bearing part in the form of a ring segment groove 63 attached thereto. Here, the coaxial arrangement of the ring segment groove 63 with respect to the swivel axis 59 is equally apparent. Within the ring segment groove 63, the ring segment web 67 is provided as a second sliding bearing part, said ring segment web being affixed to respectively one cantilever beam 66, which in turn is part of the console element 56.

In this exemplary embodiment, again the advantageous assembly of the console element 56 at the seat structure is apparent. It is obvious how the upper retaining portion 81 firstly can be inserted into an upper receiving portion 82 in order to be then pushed downwards by insertion of the lower retaining portion 83 into the lower receiving portion 84.

The portion of the backrest 88 which is not necessarily required to be cushioned is disposed below the armrest 51.

Figure 9:
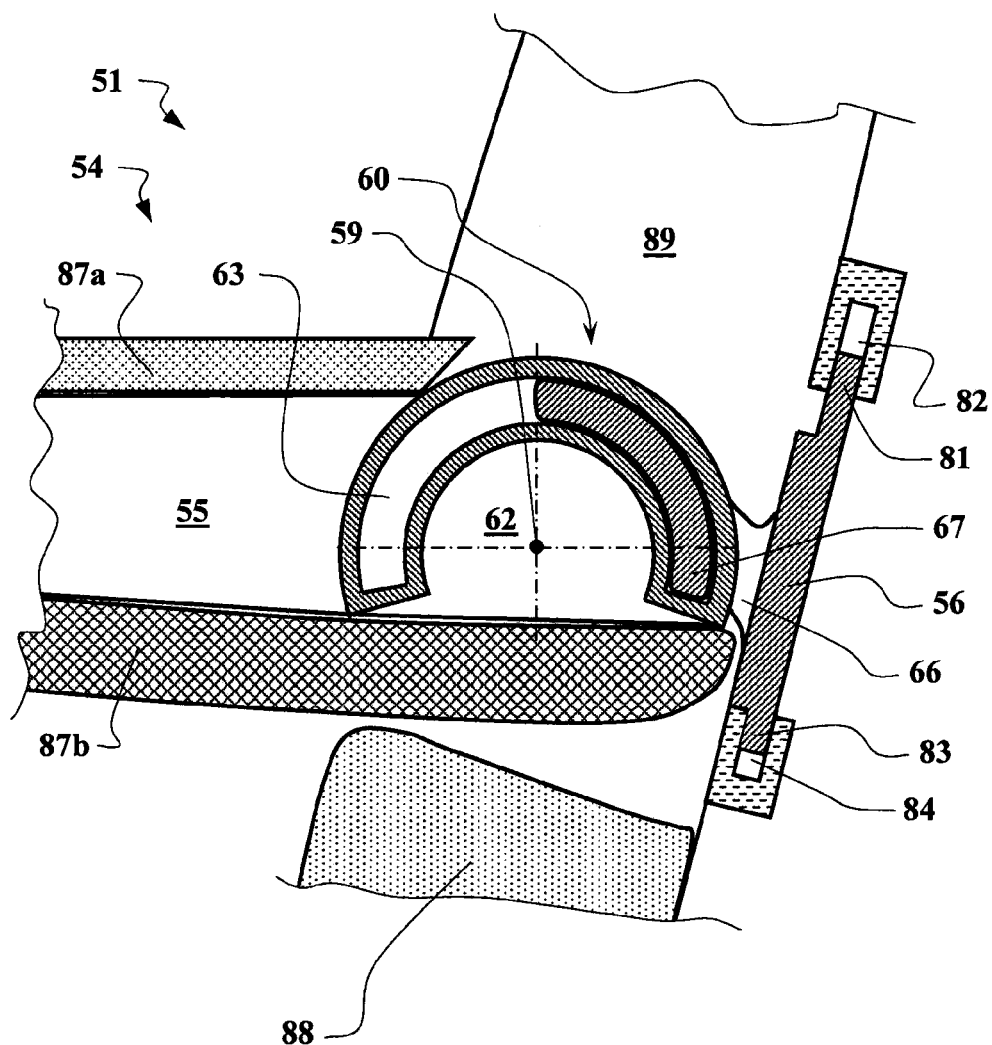
FIG. 9 shows a cross-sectional view of the sliding bearing 60 of the armrest 51 in the support position.

The functioning of the second bearing alternative is particularly clearly illustrated in FIG. 9 in comparison with FIG. 8. Again, the armrest 51 having the arm support 54 in the support position is illustrated. The structure of the arm support 54 having the support element 55 and the upper cushioning 87a as well as the lower cushioning 87b are apparent. The end portion of the support element 55 for each sliding bearing 60 is formed by the cantilever arm 62 having the ring segment groove 63 as a first sliding bearing part. Said ring segment groove 63 slidingly moves around the ring segment web 67 as the second sliding bearing part.

Figure 10:
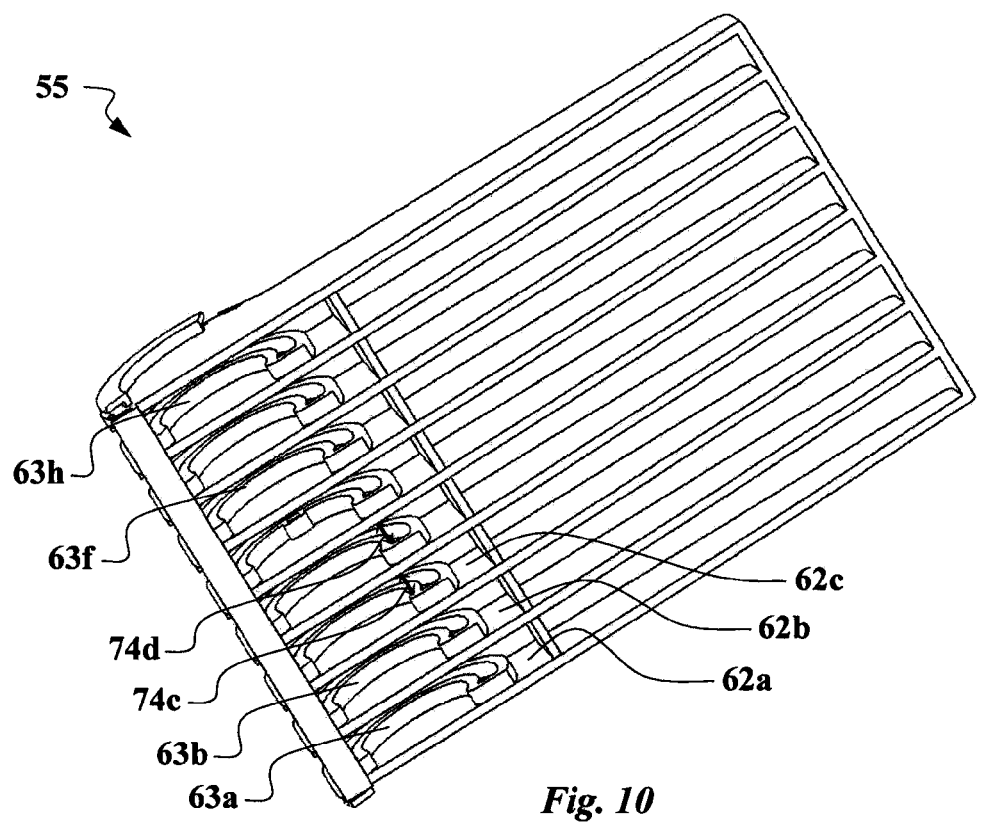
FIG. 10 shows the support element 55 of the embodiment according to FIG. 5.

FIG. 10 shows the support element 55 of the embodiment according to FIG. 5. The structure having the plurality of cantilever arms 62a to 62h is apparent, at which the first sliding bearing part is attached in the form of a ring segment groove 63a to 63h respectively on a first side. Moreover, it is apparent that the support element 55 simultaneously forms the supporting structure of the arm support 54 and comprises the first sliding bearing parts 63 of the bearing arrangement 58.

Moreover, it is apparent that an assembly space 74 is respectively provided between a ring segment groove 63 and the subsequent cantilever arm 62. This assembly space is required to enable assembly of the support element 55 at the console element 56 in the second assembly alternative.

Figure 11:
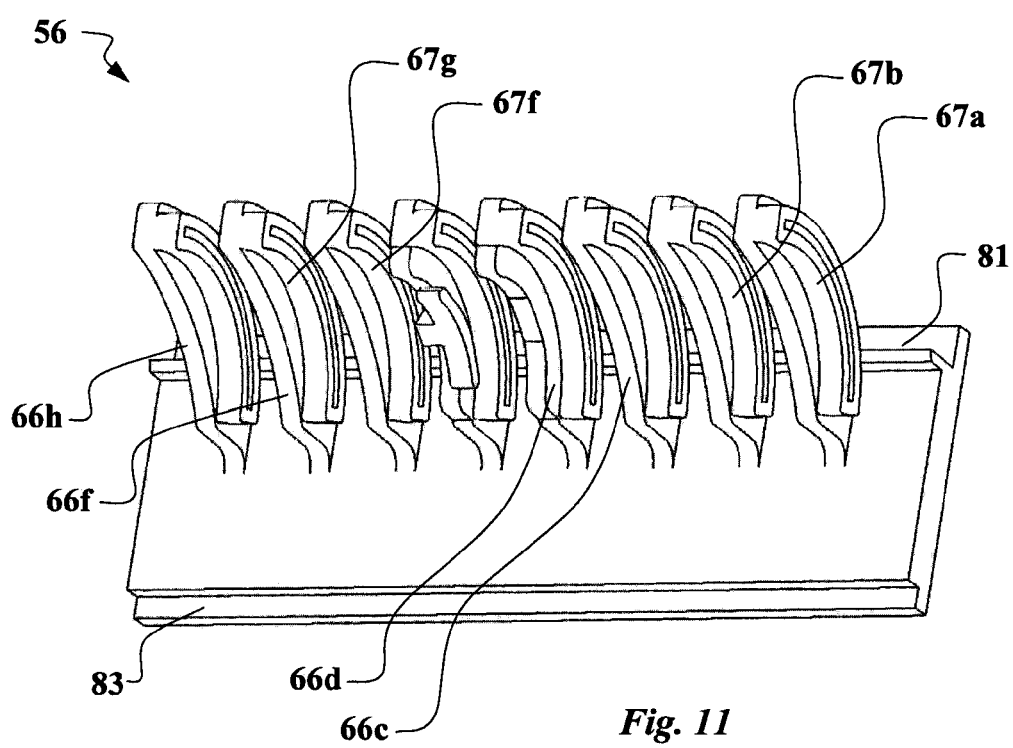
FIG. 11 shows the console element 56 of the embodiment according to FIG. 5.

For this purpose, FIG. 11 shows the console element 56 of the embodiment according to FIG. 5. Again, the structure of the console element 56 having the upper retaining portion 81 and the lower retaining portion 83 is apparent. The plurality of cantilever beams 66a to 66h extend from the base plate of the console element 56. A respective second sliding bearing part is disposed at each of said cantilever beams in the form of a ring segment web 67a to 67h. Corresponding to the allocation of the first sliding bearing part to the second sliding bearing part, the ring segment webs 67 are consequently disposed at one side of the cantilever beam 66.

Figure 12:
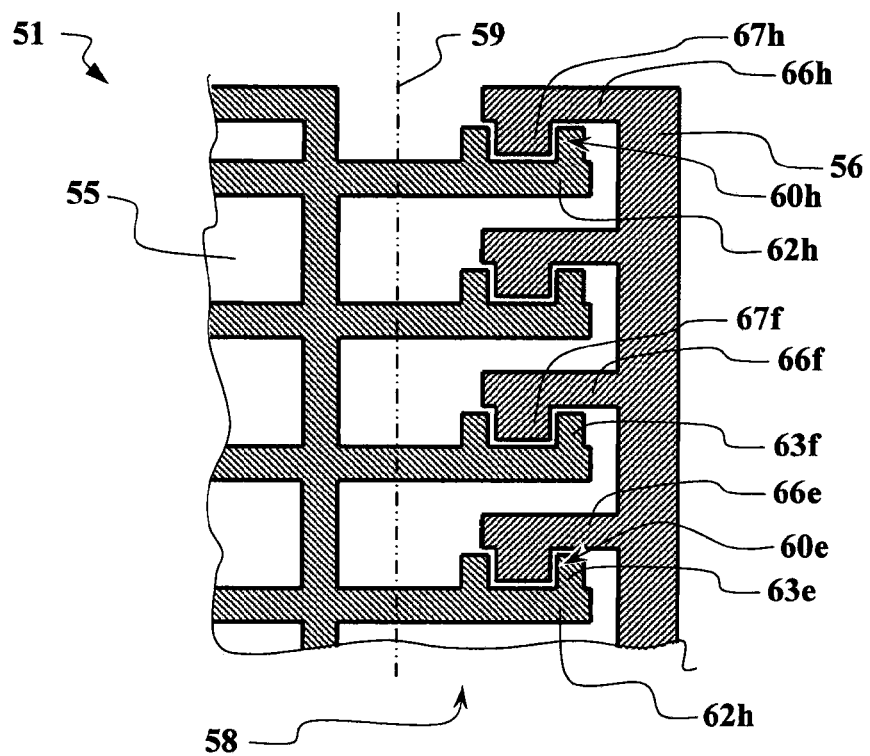
FIG. 12 shows a schematic explanation of the bearing arrangement 58 of the embodiment according to FIG. 5.

The allocation of the console element 56 at the support element 55 is schematically illustrated in FIG. 12, wherein only one section of the armrest 51 is schematically illustrated. The support element 55 is disposed on the left-hand side and the console element 56 is disposed on the right-hand side. The ring segment grooves 63 are disposed at the respective cantilever arms 62 of the support element 55. The ring segment webs 67 are disposed so as to be slidably mounted therein and are disposed at the respective cantilever beam 66. Hence, a plurality of sliding bearings 60a to 60h are produced. It should be noted in contrast to the bearing arrangement 08 according to FIG. 2 that the swivel axis 59 in this case does not extend through the center of the actual bearing location in FIG. 12, but due to the ring segment shape is disposed in the center so as to be offset with respect to the bearing location.

Figure 13:
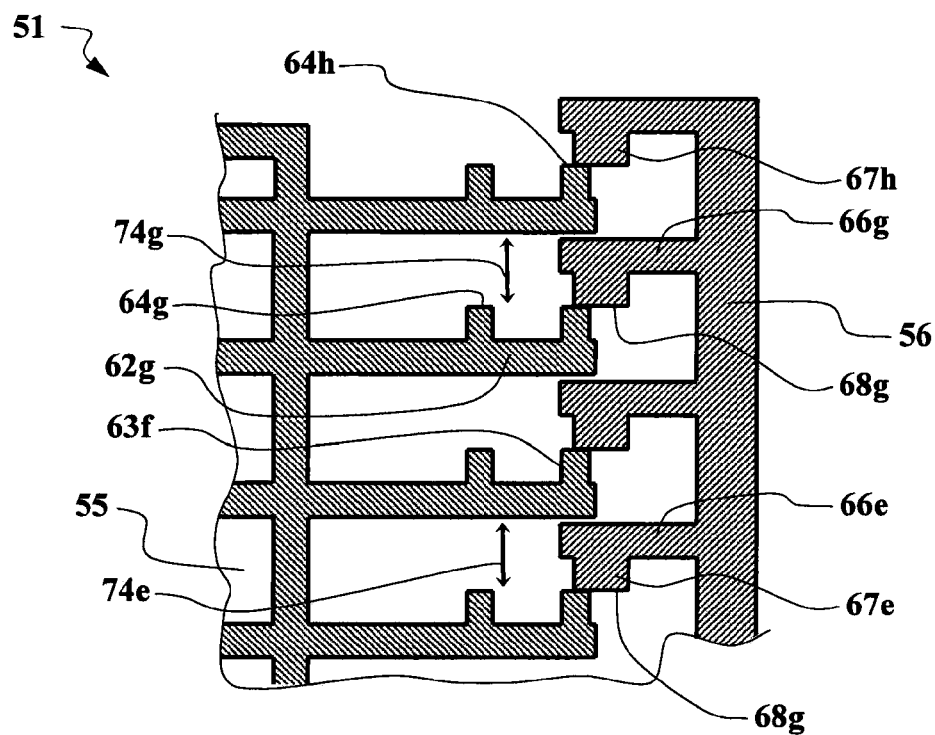
FIG. 13 schematically shows the assembly of the armrest 51 according to FIG. 5.

The assembly of the support element 55 at the console element 56 here is supposed to be exemplarily illustrated in FIG. 13. Again, a section of the armrest 51 in the assembly state is apparent. An assembly space 74 is respectively produced between the ring segment groove 63 and the subsequent cantilever arm 62. Said assembly space needs to be selected such that the cantilever beam 66 of the console element 55 having the connected ring segment web 67 can be inserted into the assembly space 74. Hence, a comb-like joining of the support element 55 with the console element 56 is realized. Here, again the front faces 64 of the first sliding bearing parts, respectively the rings segments 63, can be guided along the front faces 68 of the second sliding bearing parts, respectively the ring segment webs 67. If a coinciding positioning of the ring segment web 67 relative to the ring segment groove 63 is reached, the ring segment webs 67 then can be inserted into the ring segment grooves 63 while forming the sliding bearings 60, respectively the bearing arrangement 58.

Figure 14:
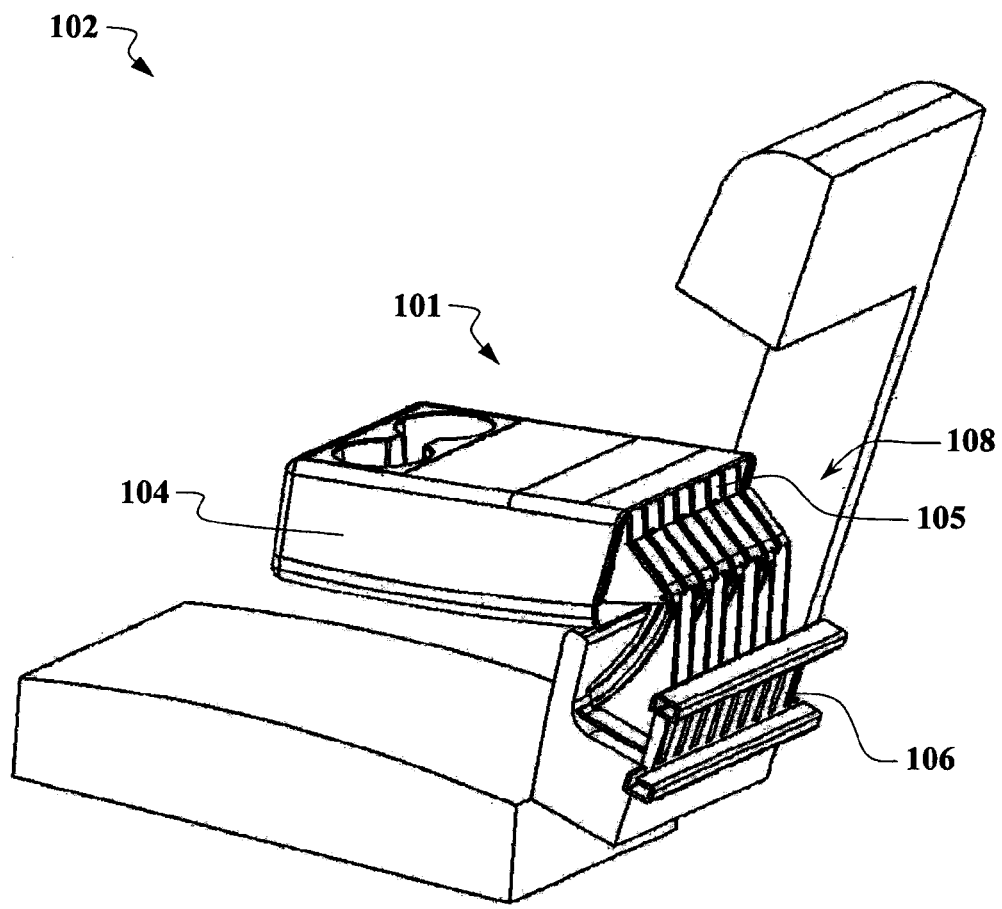
FIG. 14 shows a section of a seat bench 102 having an armrest 101 in a third bearing alternative and a second assembly alternative.

FIG. 14 schematically illustrates a third bearing alternative, wherein the armrest 01 is again part of a backseat 102. The swivelable arrangement of the arm support 104, illustrated in the support position, is apparent. Again, the support element 105 as a component of the arm support 104 is swivelably connected to the console element 106. According to the invention, a plurality of sliding bearings 110 is disposed on the end of the arm support 104 which faces toward the console element 106.

Figure 15:
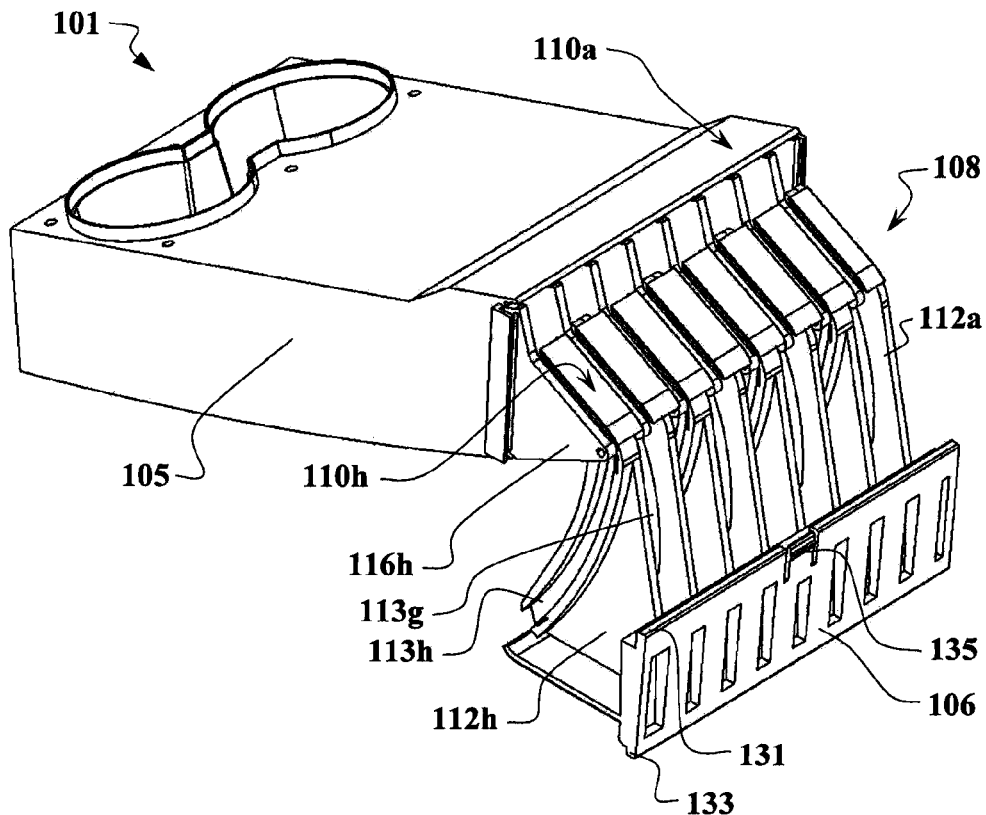
FIG. 15 shows the armrest 101 of the embodiment according to FIG. 14.

In this context FIG. 15 again schematically illustrates the armrest 101 while omitting the cushioning of the arm support 104, wherein the integral structure of the support element 105 as supporting component of the arm support 104 is apparent. The bearing arrangement 108 is realized by sliding elements 117 engaging into sliding guide grooves 113. Here, the sliding guide grooves 113a to 113h, which each form the first sliding bearing part, are disposed on the respective first side at a cantilever arm 112a to 112h. Said cantilever arms 112 are again part of the console element 106, which in this exemplary embodiment, is equally provided with an upper retaining portion 131 and a lower retaining portion 133. The latching element 135 is equally apparent as integral part of the console element 106.

Figure 16:
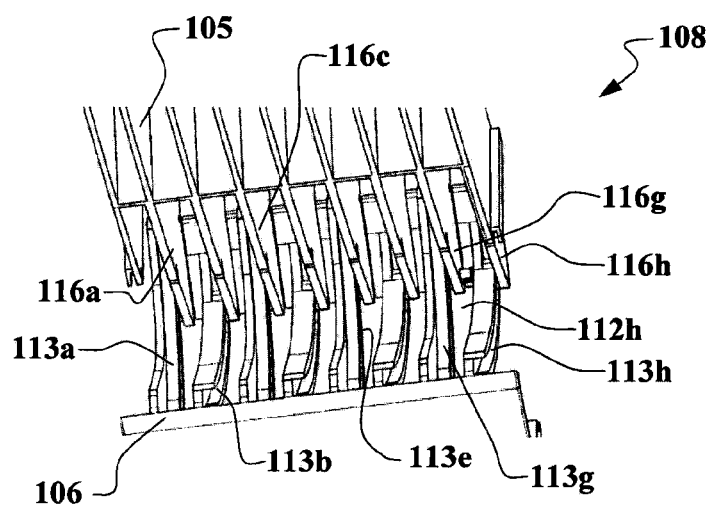
FIG. 16 shows the bearing arrangement 108 of the embodiment according to FIG. 14.

The bearing arrangement 108 is again clearly shown in FIG. 16. Again, the structure with the first sliding bearing grooves 113 in connection with the respective cantilever arms 112 as well as the allocation of the sliding elements 117, which are each attached to the cantilever beam 116, are apparent. In said third bearing alternative, a swivel movement of the arm support 104 is enabled. Said swivel movement is based on the respectively offset arrangement of the sliding guide grooves 113a, c, e, g with respect to 113b, d, f, h together with the sliding elements 117 mounted therein. Here, the sliding guide grooves 113a, 113c, 113e as well as 113g are disposed so as to be offset and raised with respect to the position of the sliding guide grooves 113b, 113d, 113f as well as 113h.

Figure 17:
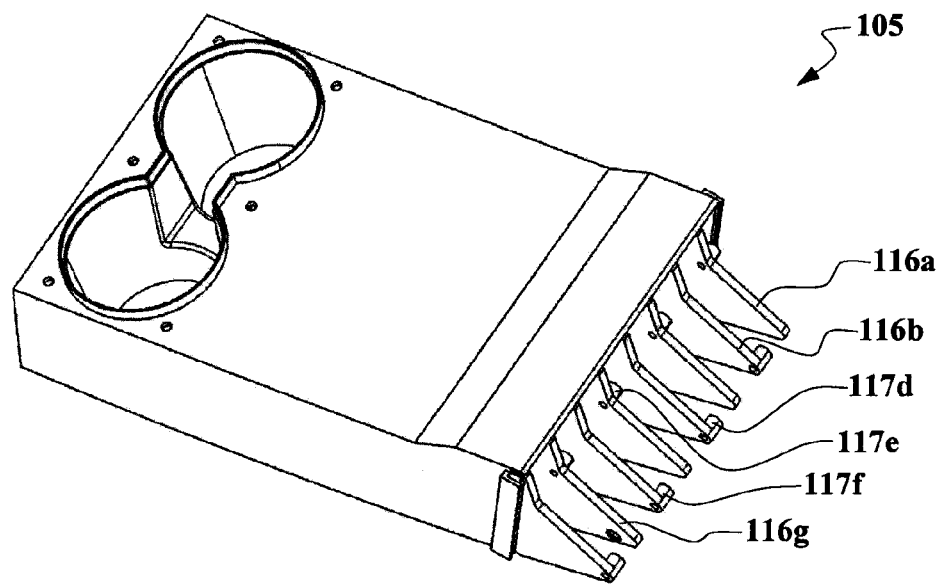
FIG. 17 shows the support element 105 of the armrest according to FIG. 14.

FIG. 17 schematically illustrates the support element 105 of the embodiment according to FIG. 14. Again, the structure having the plurality of cantilever beams 116a to 116h is apparent, at which respectively one sliding element 117 is attached as a second sliding bearing part. Moreover, it is apparent that the sliding elements 117a, c, e, g and 117b, d, f, h are disposed so as to be alternately offset. Here, the sliding elements 117b, 117d, 117f and 117h are disposed in the lower row and the sliding elements 117a, 117c, 117e and 117g are disposed in the upper row.

Figure 18:
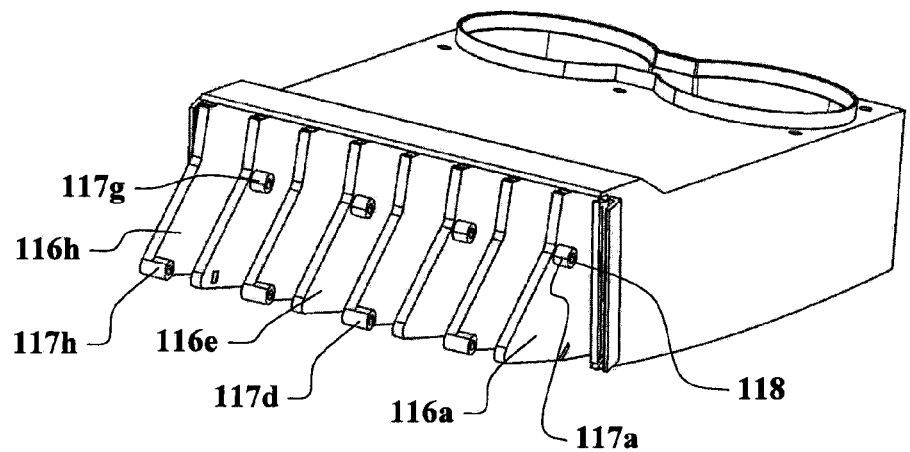
FIG. 18 shows the support element 105 in another perspective view.

FIG. 18 again illustrates the support element 105 in another perspective view.

Figure 19:
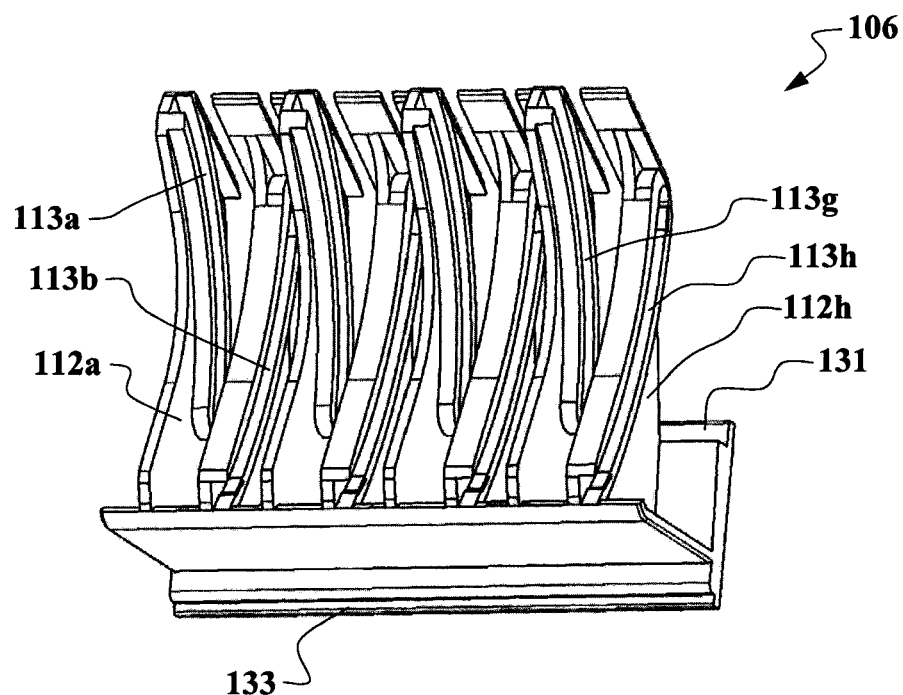
FIG. 19 shows the console element 106 of the embodiment according to FIG. 14.

FIG. 19 illustrates the console element 106 of the embodiment according to FIG. 14. The offset structure of the sliding guide grooves 113a, c, e, g with respect to 113b, d, f, h, which are each attached to the corresponding cantilever arm 112a to 112h on the first side, are apparent. Hence, it is apparent how the sliding elements 117 which are disposed so as to be offset at the support element 105 are able to slide in the sliding guide grooves 113 of the console element 106.

Figure 20:
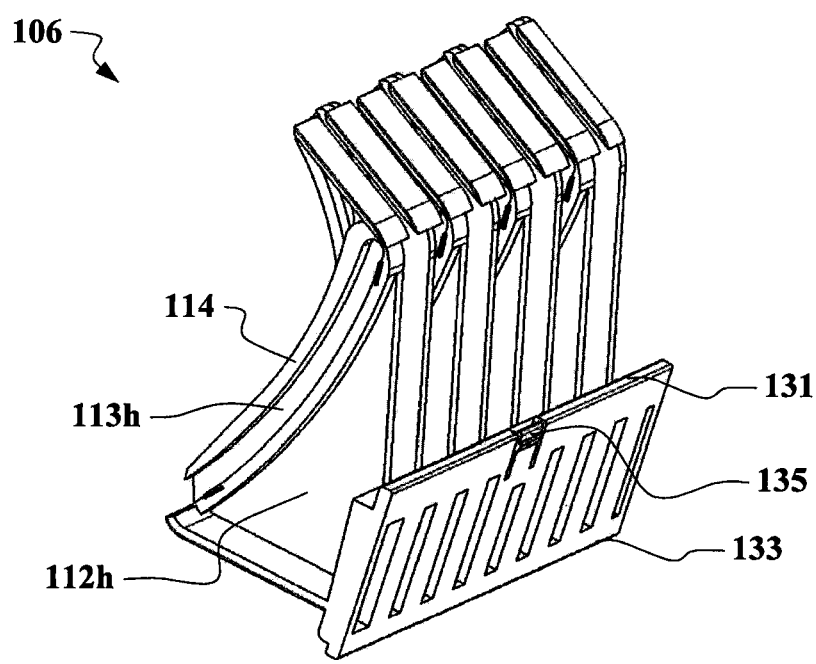
FIG. 20 shows a further perspective view of the console element 106.

FIG. 20 again schematically illustrates the console element 106 in a further perspective view.

Figure 21:
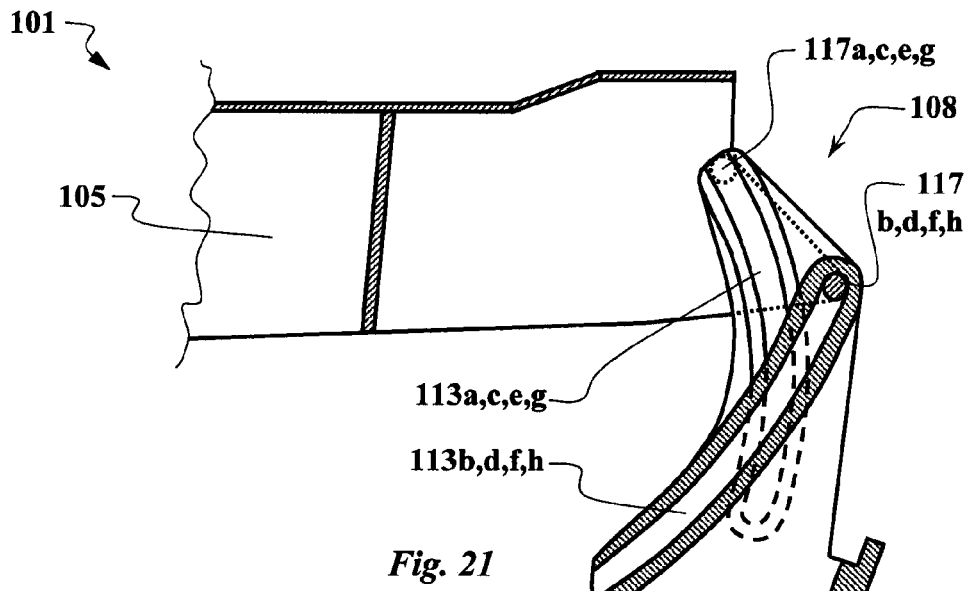
FIG. 21 shows a cross-sectional view of the bearing arrangement 108 of the armrest 101 in the support position.

The functioning of the third bearing alternative is schematically illustrated in FIG. 21 in a partial cross-sectional view of the bearing arrangement 108. The structure of the armrest 101 having the support element 105 as well as the console element 106 is apparent. A sliding guide groove 113 is connected to the console element 106 respectively with the aid of a cantilever arm 112. Here, the sliding guide grooves 113 are disposed so as to be offset from each other with two different alignments. The position of the lower sliding guide grooves 113b, 113d, 113f as well as 113h and the upper sliding guide grooves 113a, 113c, 113e and 113g is apparent. In the sliding guide grooves 113, the sliding elements 117 are respectively mounted. Corresponding to the offset arrangement of the sliding guide grooves 113, the sliding elements 117 are equally disposed in two different positions, with the lower positions 117b, 117d, 117f and 117h and the upper positions 117a, 117c, 117e and 117g. The sliding elements 117 here are each connected to corresponding cantilever beams 116 of the support element 105.

Figure 22:
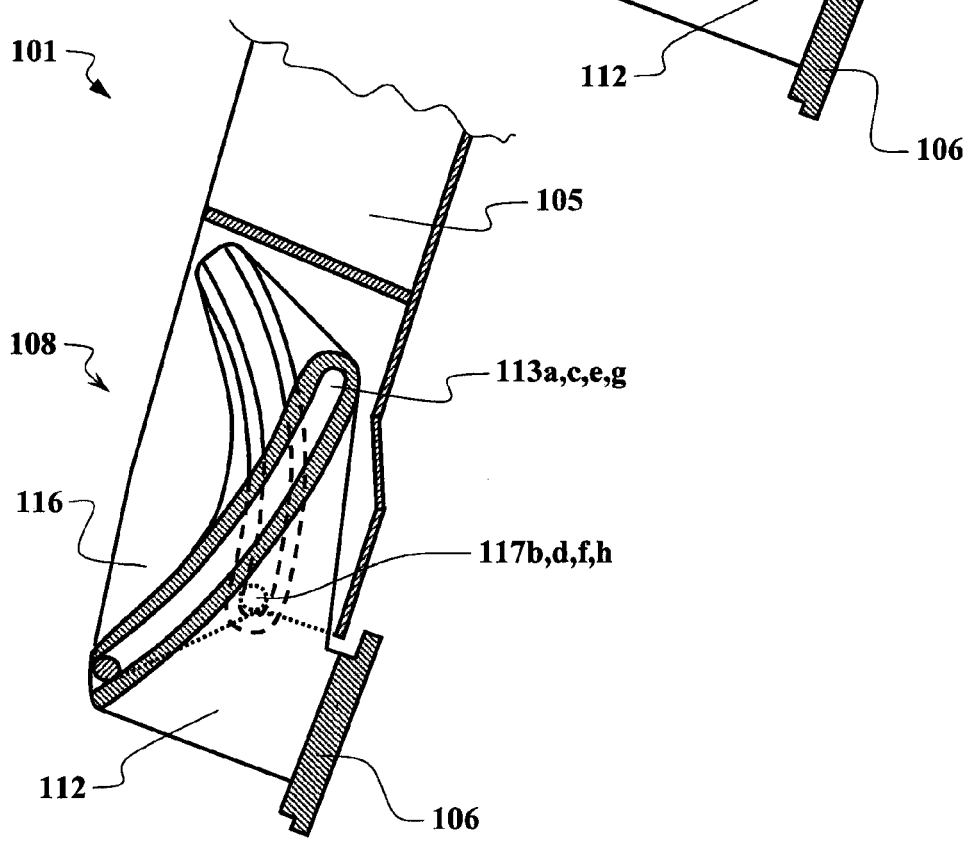
FIG. 22 shows a cross-sectional view of the bearing arrangement 108 of the armrest 101 in the rest position.

FIG. 22 in addition to FIG. 21 schematically illustrates the bearing arrangement 108 of the armrest 101 in the rest position of the arm support 104. It is apparent that the sliding elements 117 are now disposed at the lower end of the respective sliding guide grooves 113.

Moreover, in a combined view of FIGS. 21 and 22, the advantageous swivel movement of the arm support 104 is shown. Hence, upon swiveling of the arm support 104 starting from the rest position illustrated in FIG. 22 into the support position illustrated in FIG. 21, in addition to the swivel movement of the arm support 104, a lifting and forward displacement of the arm support 104 into the passenger compartment takes place simultaneously.

Starting from the distance between the two sliding elements 117 arranged so as to be offset, it is apparent that said distance needs to be taken into account in the implementation of the swivel movement and thus of the sliding guide grooves 113.

Figure 23:
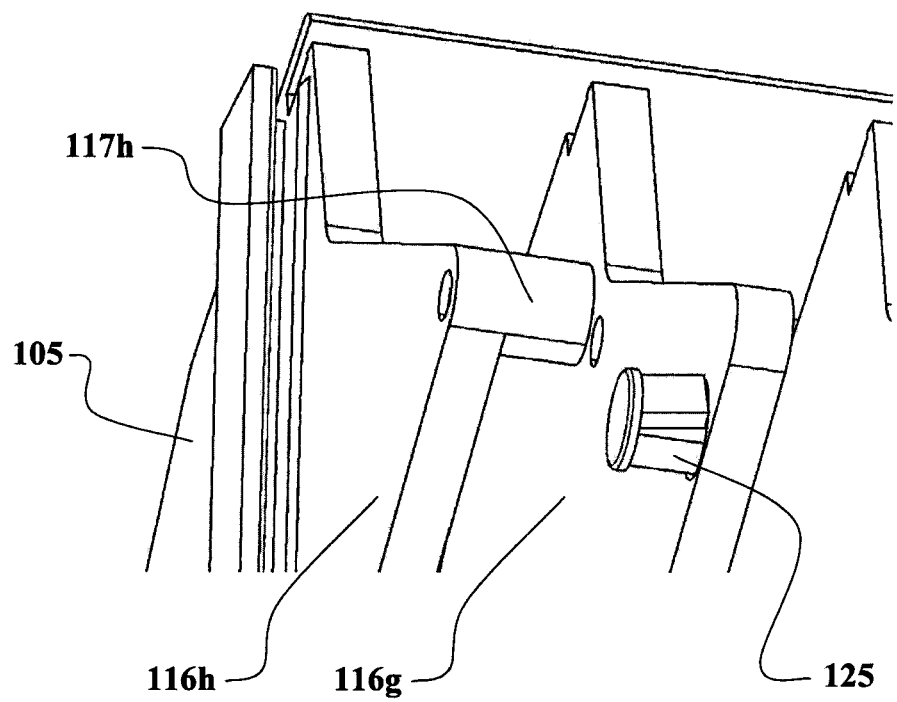
FIG. 23 shows an exemplary embodiment for a locking mechanism 125 for use with the armrest 101.

FIG. 23 schematically illustrates an example of a latching bolt 125 for preventing disassembly. Here, a latching bolt 125 is preassembled at the support element 105 in the region of the cantilever beam 116. Said latching bolt firstly is disposed so as to be plunged within the cantilever beam 116. By means of the subsequent assembly of the console element 106 at the support element 105 with the aid of the second assembly alternative, the latching bolt 125 is simultaneously displaced into the position illustrated in FIG. 23. It is apparent that a disassembly movement is prevented for the cantilever arm 112h together with its sliding guide groove 113h being mounted between the latching bolt 125 at the cantilever beam 116g and the subsequent cantilever beam 116h together with its sliding element 117h.

Figure 24:
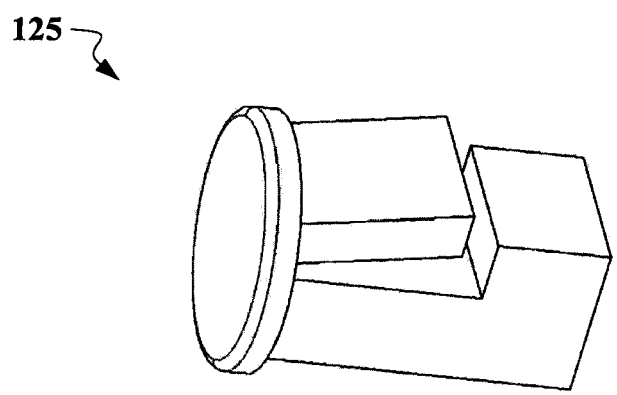
FIG. 24 shows a latching element 125 for the locking mechanism according to FIG. 23.

In this context, FIG. 24 exemplarily illustrates the latching bolt 125.

The exemplarily illustrated first, second and third bearing alternatives and the first, second and third assembly alternatives illustrated in connection therewith provide further obvious possible combinations. Hence, the first bearing alternative can equally be realized by the second assembly alternative or the second, respectively third bearing alternative can equally be realized by the first assembly alternative.

By the same token, it is obvious that the allocation of the cantilever arm having the first sliding bearing part and the allocation of the cantilever beam having the second sliding bearing part either to the support element or the console element can equally be exchanged in the different exemplary embodiments.

The invention claimed is:

1. An armrest for arrangement with a seat or a seat bench in a vehicle, said armrest comprising:
    a console element, which can be attached to a seat or seat bench;
    an arm support, which includes a support element; and
    a bearing arrangement including at least three sliding bearings, each sliding bearing having a first arcuate sliding bearing part and second mating sliding bearing part received in the first arcuate sliding bearing part such that the second mating sliding bearing part slides along the first sliding bearing part, wherein the arm support is swivelable about a swivel axis defined by the arc of the arcuate sliding part between a swiveled-up rest position and a swiveled-down support position, and wherein the console element comprises the first sliding bearing part and the support element-comprises the second sliding bearing part, the console element and the support element being made of a plastic material, wherein the at least three sliding bearings are disposed so as to be distributed on an end of the armrest which, in the support position, faces toward the console element.

2. The armrest according to claim 1, in which the console element and the support element are injection-molded parts made of a thermoplastic material.

3. The armrest according to claim 1, in which the armrest is substantially completely composed of a plastic material.

4. The armrest according to claim 1, in which the support element integrally forms a stiffening supporting structure of the arm support.

5. The armrest according to claim 1, in which in a region below the arm support, the console element forms a portion of the seat or seat bench.

6. The armrest according to claim 1, in which form-fitting assembly parts attach the console element to the seat or the seat bench.

7. The armrest according to claim 6, in which for the purpose of assembly, an upper retaining portion of the console element can be inserted and/or swiveled into an upper receiving portion of the seat or the seat bench, and a lower retaining portion of the console element can be inserted and/or swiveled into a lower receiving portion of the seat or the seat bench.

8. The armrest according to claim 6, in which a latching element prevents disassembly of the console element from the seat or the seat bench.

9. The armrest according to claim 1, in which the first sliding bearing part is disposed at the end of a cantilever arm formed by one of the console element and the support element, and the second sliding bearing part is disposed at the end of a cantilever beam formed by the other of the support element and the console element.

10. The armrest according to claim 1, in which the first sliding bearing part is a bearing sleeve and the second sliding bearing part is a shaft portion.

11. The armrest according to claim 1, in which the first sliding bearing part is a ring segment groove disposed coaxially with respect to a swivel axis, and the second sliding bearing part is a ring segment web which can be swiveled about the swivel axis in the ring segment groove, wherein a segment angle of the ring segment web is smaller than a segment angle of the ring segment groove at least by a swivel angle of the arm support.

12. The armrest according to claim 9, in which the cantilever beam is elastically deformable during assembly and an assembly movement perpendicular to the swivel axis is enabled, wherein a front face of the first sliding bearing part slides along a front face of the second sliding bearing part, wherein when the sliding bearing parts coincide in their position, the cantilever beam is restored to its original shape and the second sliding bearing part plunges into the first sliding bearing part to form the sliding bearing.

13. The armrest according to claim 12, in which at least two cantilever beams having respective second sliding bearing parts are symmetrically disposed opposite each other.

14. The armrest according to claim 12, in which each bearing sleeve as the first sliding bearing part is provided with two symmetrically opposed shaft portions as second sliding bearing parts.

15. The armrest according to claim 12, including a locking mechanism inserted between at least two cantilever beams to substantially prevent deformation of the cantilever beams.

16. The armrest according to claim 10, in which one of the bearing sleeve and the shaft portion is made of a first injection-molded material, and wherein the other of the shaft portion and the bearing sleeve is made of a second injection-molded material.

17. The armrest according to claim 16, in which the shaft portions-of the bearing arrangement form a hollow shaft being interrupted by the cantilever beams of one of the support element and the console element.

* * * * *